(12) United States Patent
Hendrickson et al.

(10) Patent No.: US 11,106,602 B2
(45) Date of Patent: Aug. 31, 2021

(54) MEMORY BLOCKADE FOR VERIFYING SYSTEM SECURITY WITH RESPECT TO SPECULATIVE EXECUTION

(71) Applicant: INTERNATIONAL BUSINESS MACHINES CORPORATION, Armonk, NY (US)

(72) Inventors: Olaf Hendrickson, Rochester, MN (US); Matthew Michael Garcia Pardini, Middlesex, MA (US); Michael P. Mullen, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 36 days.

(21) Appl. No.: 16/560,003

(22) Filed: Sep. 4, 2019

(65) Prior Publication Data

US 2021/0064550 A1 Mar. 4, 2021

(51) Int. Cl.
*G06F 12/14* (2006.01)
*G06F 11/30* (2006.01)
*G06F 9/38* (2018.01)
*G06F 12/0802* (2016.01)
*G06F 11/263* (2006.01)

(52) U.S. Cl.
CPC ........ *G06F 12/1458* (2013.01); *G06F 9/3842* (2013.01); *G06F 11/263* (2013.01); *G06F 11/3037* (2013.01); *G06F 12/0802* (2013.01)

(58) Field of Classification Search
CPC .................. G06F 12/10; G06F 16/2255; G06F 2212/657; G06F 3/0604; G06F 3/0659; G06F 3/0673
See application file for complete search history.

(56) References Cited

U.S. PATENT DOCUMENTS

| 5,815,688 A | 9/1998 | Averill |
| 2019/0004961 A1 | 1/2019 | Boggs et al. |

OTHER PUBLICATIONS

Guarnieri, Marco, et al., "Spectector: Principled Detection of Speculative Information Flows," arXiv preprint arXiv:1812.08639, 2018, 17 pages.
Khasawneh, Khaled N. et al. "SafeSpec: Banishing the Spectre of a Meltdown with Leakage-Free Speculation", arXiv preprint arXiv:1806.05179, 2018, 12 pages.

(Continued)

*Primary Examiner* — Yong J Choe
(74) *Attorney, Agent, or Firm* — Cantor Colburn LLP; Margaret McNamara

(57) ABSTRACT

A computer-implemented method includes generating a plurality of test cases to test exploitation of speculative execution in a design of a computer processor, where the plurality of test cases include a first test case. Generating the first test case includes identifying a branch responsive to an attempted access to secure data and, responsive to the branch, marking each memory address of each memory access dependent on the attempted access to the secure data. The computer-implemented method further includes executing the first test case. Executing the first test case includes detecting an attempt to access a memory address that has been marked and, responsive to the attempt to access the memory address that has been marked, alerting of a security violation.

20 Claims, 3 Drawing Sheets

(56) References Cited

OTHER PUBLICATIONS

Kocher, Paul et al. "Spectre Attacks: Exploiting Speculative Execution", University of Pennsylvania and University of Maryland; retrieved from URL: https://spectreattack.com/spectre.pdf [or] https://arxiv.org/abs/1801.01203; submitted Computer Science Cryptography and Security, Jan. 3, 2018; 16 pgs.

Lipp, Moritz et al. "Meltdown" Computer Science, Cryptography and Security; Jan. 3, 2018; retrieved from URL: https://arxiv.org/abs/1801.01207; 16 pgs.

Wang, Guanhua, et al., "oo7: Low-overhead Defense against Spectre attacks via Binary Analysis," arXiv preprint arXiv:1807.05843, 2018, 14 pages.

Wichelmann, Jan, et al., "Microwalk: A Framework for Finding Side Channels in Binaries," Proceedings of the 34th Annual Computer Security Applications Conference, ACM, 2018; pp. 161-173.

Yan, Mengjia, et al., "InvisiSpec: Making Speculative Execution Invisible in the Cache Hierarchy," 2018 51st Annual IEEE/ACM International Symposium on Microarchitecture (MICRO), IEEE, 2018; pp. 428-441.

MEMORY BLOCKADE FOR VERIFYING SYSTEM SECURITY WITH RESPECT TO SPECULATIVE EXECUTION

BACKGROUND

The present invention relates to computer security and, more specifically, to a memory blockage for verifying system security with respect to speculative execution.

The security of a computer system can be compromised through the exploitation of speculative execution performed by a processor of the computer system. Speculative execution is an optimization technique in which data is stored in the processor cache before it is guaranteed that such data are needed. In other words, a processor of the computer system moves data into the cache based on a determination that instructions will be performed using that data.

SUMMARY

Embodiments of the present invention are directed to a computer-implemented method for testing a processor design. A non-limiting example of the computer-implemented method includes generating a plurality of test cases to test exploitation of speculative execution in a design of a computer processor, where the plurality of test cases, include a first test case. Generating the first test case includes identifying a branch responsive to an attempted access to secure data and, responsive to the branch, marking each memory address of each memory access dependent on the attempted access to the secure data. The computer-implemented method further includes executing the first test case. Executing the first test case includes detecting an attempt to access a memory address that has been marked and, responsive to the attempt to access the memory address that has been marked, alerting of a security violation.

Embodiments of the present invention are directed to a system for testing a processor design. A non-limiting example of the system includes a test generator and a simulation environment. The test generator is configured to generate a plurality of test cases to test exploitation of speculative execution in a design of a computer processor, the plurality of test cases including a first test case. The test generator is further configured to detect, in the first test case, a branch responsive to an attempted access to secure data and, responsive to the branch, to mark each memory address of each memory access dependent on the attempted access to the secure data. The simulation environment includes a logic simulation model, which is a logical representation of the computer processor, and a simulated memory. The simulation environment is configured to execute the first test case over the logic simulation model and the simulated memory. To execute the first test case, the simulation environment is configured to detect an attempt to access a memory address that has been marked and, responsive to the attempt to access the memory address that has been marked, alert of a security violation.

Embodiments of the invention are directed to a computer-program product for testing a processor design, the computer-program product including a computer-readable storage medium having program instructions embodied therewith. The program instructions are executable by a processor to cause the processor to perform a method. A non-limiting example of the method includes generating a plurality of test cases to test exploitation of speculative execution in a design of a computer processor, where the plurality of test cases, include a first test case. Generating the first test case includes identifying a branch responsive to an attempted access to secure data and, responsive to the branch, marking each memory address of each memory access dependent on the attempted access to the secure data. Further according to the method, the first test case is executed. Executing the first test case includes detecting an attempt to access a memory address that has been marked and, responsive to the attempt to access the memory address that has been marked, alerting of a security violation.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
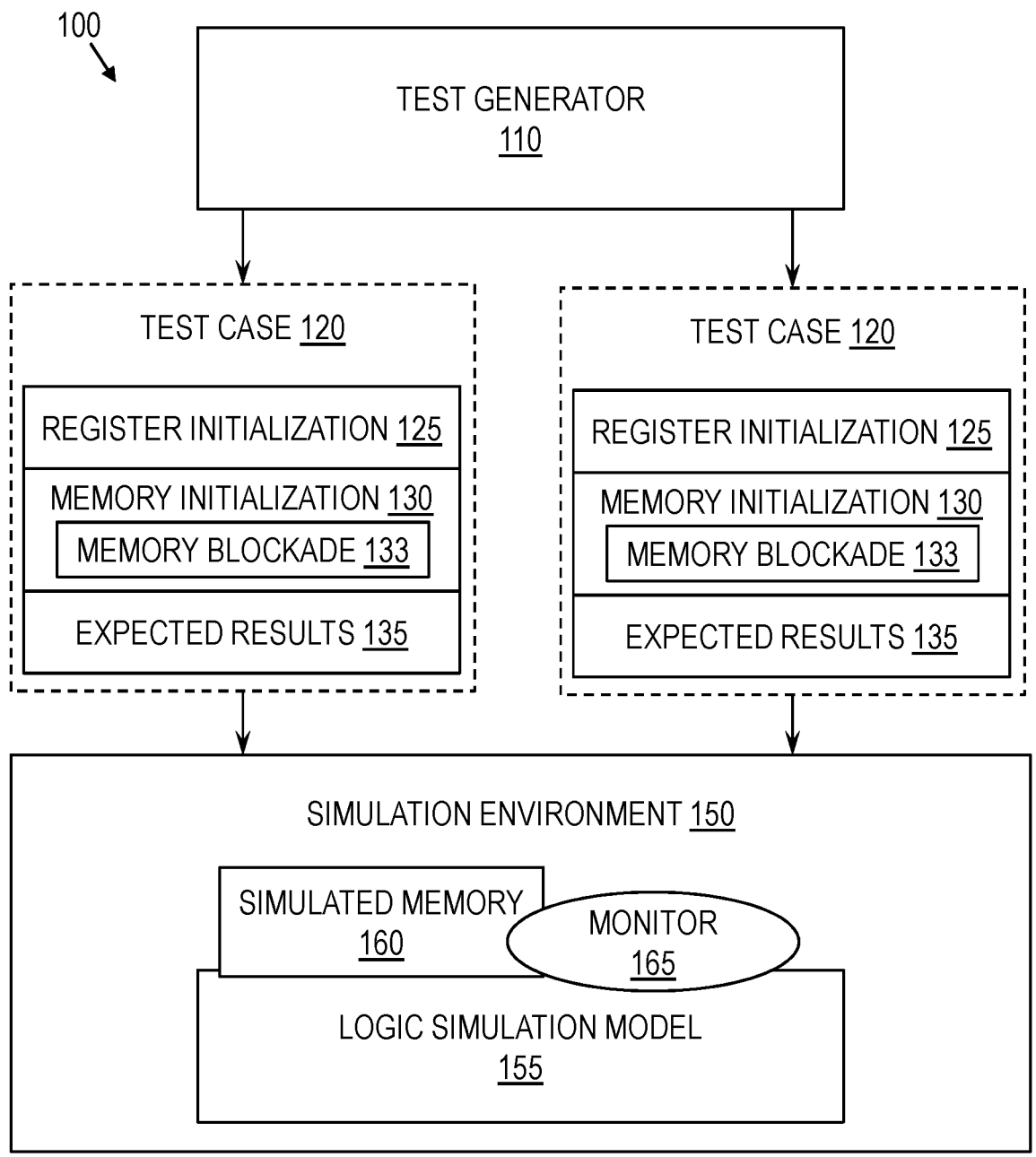
FIG. 1 is a diagram of a testing system to determine whether a processor protects against exploitation of speculative execution, according to some embodiments of the invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two- or three-digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e., one, two, three, four, etc. The terms "a plurality" may be understood to include any integer number greater than or equal to two, i.e., two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, speculative execution can violate security assumptions that are the basis of numerous software security mechanisms. As a result, speculative execution in the hardware can cause software security to fail in some respects. An exploitation of speculative execution could allow an unauthorized program to see secure data currently residing in the cache due to speculative execution related to that secure data.

For instance, in the case of a spectre attack, a processor is induced to speculatively perform operations that would not occur during typical execution, and such operations leak confidential information via a side channel. In the case of a meltdown attack, out-of-order execution due to speculative execution can cause a leak of data in physical memory.

Generally, prior to fabrication, a processor design can be tested in a simulation environment to verify that various security concerns are addressed. For instance, current processor design tests routinely try to load data that is protected (i.e., secure data). Protected data may include, for example, certain system data or data belonging to users other than the current user. Typically, a computer system's architecture determines which data is protected. With existing testing, the processor's response when an instruction attempts to access secure data is to recognize this access as an exception and, as a result, to interrupt execution of the current instruction stream and branch to an exception handler. However, because some pipelined processors try to speculatively pre-execute when possible, the processor may speculatively execute additional instructions in that instruction stream Like the instruction that attempted to access secure data, these additional instructions may also be malicious. Current testing systems, although state of the art, do not address this potential exploitation of speculative execution.

Turning now to an overview of the aspects of the invention, one or more embodiments of the invention address the above-described shortcomings of the prior art by providing an improved testing system that generates and implements tests related to dependent accesses based on secure data access. More specifically, tests are generated to include dependent accesses based on accesses to secure data. In a simulated environment, these tests are executed, such that when a branch occurs (e.g., a branch to an exception handler or otherwise), embodiments of the invention mark each memory address that is the subject of a dependent access based on the instruction that caused the branch. Thus, when a later attempt is made to access such a marked memory address, the testing system may alert to this attempted access, even though the marked memory address may or may not include secure data itself.

The above-described aspects of the invention address the shortcomings of the prior art by generating and implementing tests that focus on dependent accesses after exceptions, or other branches. When embodiments of the invention are used, potential security breaches can be detected, and as a result, processors can be manufactured to include improved security. Thus, embodiments of the invention add a new dimension to pre-silicon verification, aimed at system security.

Turning now to a more detailed description of aspects of the present invention, FIG. 1 is a diagram of a testing system 100 to determine whether a processor protects against exploitation of speculative execution, according to some embodiments of the invention. Generally, the testing system 100 verifies security measures of a computer processor based on a processor design, by determining the handling of dependent accesses after an attempt to access secure data, or after another implicit or explicit branch occurs.

As shown in FIG. 1, according to some embodiments of the invention, a testing system 100 includes a test generator 110, one or more test cases 120, and a simulation environment 150. Each test case 120 may include one or more groups of activities: register initialization 125, memory initialization 130, and expected results 135. The simulation environment 150 may include a logic simulation model 155 and simulated memory 160 representing, respectively, a computer processor and physical memory in the form of simulations, and the simulation environment 150 may additionally include a monitor 165. Generally, the test generator 110 may generate one or more test cases 120, each of which may be executed in the simulation environment 150, which simulates a computer processor and memory. The test generator 110, test cases 120, and simulation environment 150 will be described in more detail below.

The test generator 110 may generate one or more test cases 120, which may typically be a large number of test cases directed to test a processor design. In some embodiments of the invention, the test generator 110 may be adapted from an existing test generator 110, which typically generates pseudo-random test cases. However, in some embodiments of the invention, the test generator 110 is configured to generate a certain type of test case for testing exploitation of speculative execution.

More specifically, in some embodiments of the invention, the test generator 110 generates a test case 120 in which a series of operations (i.e., instructions) are to be performed, where at least one of such operations accesses secure data. Further, the series of operations may include one or more dependent accesses, including a dependency on the secure data access. In other words, at least one operation may be dependent on the secure data access. A dependent access is one in which data is moved to a register, memory, or other facility and a later operation utilizes the data in that register, memory, or other facility. In this case, one or more dependent accesses depend on the secure data access. Although it is expected that the secure data access will cause an exception, embodiments of the invention test whether such dependent accesses are also blocked or, rather, whether such dependent accesses could still be performed speculatively, as might be the case in an attack. Additionally, in some embodiments of the invention, in the test case 120, the test generator 110 ensures that the blockaded memory referenced speculatively in each such dependent access is excluded from being accessed in other contexts (i.e., outside of the speculative dependent access), as such other references may result in a false positive for a security violation when the test case 120 is executed. Further, in the test case 120, the test generator 110 may add a command to block access to each memory address of such speculatively dependent access that relies on a secure data access.

In some embodiments of the invention, as described further below, blocking is performed by marking a memory address (i.e., specifically, a memory address for which an instruction sought access dependent on access to secure data) and, further, by monitoring such marked memory addresses for further access attempts. In short, the assumption is that such memory addresses may contain data that is to be avoided due to possible involvement in an exploitation of speculative execution. Thus, by adding a memory blockade 133 to the test case 120, embodiments of the invention are able to monitor such memory addresses to determine whether the processor, in the form of the logic simulation model 155, allows access to such memory addresses. In some embodiments of the invention, multiple such test cases 120 may be generated by the test generator 110.

Each test case 120 may include register initialization 125, memory initialization 130, and expected results 135. Generally, register initialization 125 initializes the registers, for instance, to null values or to values expected for operations to be performed in the test represented by the test case 120. Memory initialization 130 initializes the memory (i.e., in the form of the simulated memory 160), for instance, to null values or to expected values. The expected results 135 of a test case 120 indicate data in the memory or registers, or both, after execution of the operations in the test case. For instance, these expected results 135 may be generated by the test generator 110 based on the operations to be performed and may be encapsulated with, or otherwise associated with, the test case 120 to enable confirmation of the expected results 135.

As compared to existing test cases 120, embodiments of the invention incorporate additional aspects that render test cases 120 appropriate for testing exploitation of speculative execution. In some embodiments of the invention, memory initialization 130 includes initialization of a memory blockade 133, which, as described further below, marks certain memory addresses to determine whether such memory addresses are accessed. The memory initialization 130 may further include removing any prior markings on memory addresses, or adding markings as needed for the test case 120. As described above, each test case 120 may include a series of operations, either speculatively or with speculative content or context, including a memory access dependent on a secure data access. This series of operations may be incorporated into the test case 120, such that the series is performed after the memory initialization 130 occurs and, in some embodiments of the invention, prior to confirmation of the expected results 135. Further, the instruction to block accesses to such memory addresses may be incorporated into the test case 120 as well. For these test cases 120, the expected results 135 themselves need not be checked to determine whether a security violation occurs, according to some embodiments of the invention.

In some embodiments of the invention, the test generator 110 may generate each test case 120 to include the memory blockade 133. As mentioned above, the simulation environment 150 may include a monitor 165. The test case 120 (i.e., the test generator 110 in generating the test case 120) may direct some or all operations of the monitor 165 during execution of the test case 120.

As dictated by the test case 120, the monitor 165 may monitor communications from a computer processor, represented in the simulation environment 150 by the logic simulation model 155, to memory, represented by the simulated memory 160. One of skill in the art will understand that this access can be implemented in various ways. For example, and not by way of limitation, the monitor 165 may monitor a connection between the logic simulation model 155 and the simulated memory 160. For another example, the logic simulation model 155 may utilize one or more logs to log its communications and other activities, and the one or more logs may be readable by the monitor 165. In some embodiments of the invention, the test case 120 dictates how this monitoring occurs.

In some embodiments of the invention, the test case 120 is fully determined, such that the test generator 110 records in the test case 120 each explicit or implicit branch to be taken in execution of the operations in test case 120. The test case 120 may include one or more branches responsive to attempted access to secure data. Such a branch may be implicit (e.g., a branch to an exception handler rather than part of an instruction) or explicit (e.g., an instruction to branch). This branch may be, for example, to an exception handler upon recognition by the logic simulation model 155 that access to the secure data is not permitted. The branch may, for example, be a software security decision that the data is not to be accessed by the current program.

For each branch responsive to a decision about access to secure data, the test generator 110 may identify each instruction that involves a speculative memory access based on the secure data. In other words, the test generator 110 may identify each instruction that includes a dependent access where the dependency is on the secure data access. For each such instruction having such a dependent access, the test generator 110 may determine the memory address of the dependent access (i.e., the memory address to be accessed based on the secure data). The test generator 110 may mark, or flag, this memory address for reference. In other words, the test generator 110 may add the memory address to the memory blockade 133.

When executing the test case 120, the act of marking a memory address in the simulation environment 150 may be performed in various ways, and in some embodiments of the invention, the test generator 110 may dictate how marking is implemented. For example, and not by way of limitation, the monitor 165 may transmit a message to the logic simulation model 155 indicating that the memory address is now marked. The logic simulation model 155 may maintain a list of marked memory addresses, and may thus add each marked memory address to this list. However, it will be understood that other mechanisms for marking a memory address may be used.

In some embodiments of the invention, each test case 120 is executed in the simulation environment 150. As mentioned above, the simulation environment 150 may merely simulate the activities of a computer processor that is being tested. Thus, the logic simulation model 155 may be a logical simulation of the computer processor, which may include a set of registers and a cache, and the simulated memory 160 may be a logical simulation of physical memory. For example, and not by way of limitation, each of the logic simulation model 155 and the simulated memory 160 may be hardware, software, or a combination of both. For example, and not by way of limitation, the logic simulation model 155 may be implemented as a field-programmable gate array (FPGA), as may be the simulated memory 160. The simulation environment 150 may be one or more computer systems, or portions thereof, configured to execute the test cases 120 over the logic simulation model 155 and the simulated memory 160.

As described above, the simulation environment 150 may include a monitor 165. For example, and not by way of limitation, the monitor 165 may be a process running in the simulation environment 150, and that process may run outside of the test cases 120. For another example, the monitor 165 may be a specialized hardware circuit integrated with, or otherwise installed in, the simulation environment 150. In some embodiments of the invention, the monitor 165 monitors communications from the logic simulation model 155 to the simulated memory 160 as indicated in the test case 120. One of skill in the art will understand that this access can be implemented in various ways. For example, and not by way of limitation, the monitor 165 may monitor a connection between the logic simulation model 155 and the simulated memory 160. For another example, the logic simulation model 155 may utilize one or more logs to log its communications and other activities, and the one or more logs may be readable by the monitor 165. In some embodiments of the invention, the implementation of this connection monitoring is dictated by the test generator 110 and recorded in the test case 120.

Although FIG. 1 illustrates a simulation environment 150 and this disclosure describes testing in a simulation environment 150, it will be understood that embodiments of the invention could be implemented post-fabrication, using an actual computer processor rather than a logic simulation model 155. Thus, instead of testing the processor design, embodiments of the invention could be used to test an actual processor.

During a test case 120, the monitor 165 may look for attempted access to memory addresses that are marked (i.e., memory addresses in the memory blockade 133). More specifically, the monitor 165 may detect each request from the logic simulation model 155 to the simulated memory 160 for access to a marked memory address. Each such request may be deemed a security violation, equating with a request by a computer processor to access memory that is potentially involved in exploitation of speculative execution.

Although the marked memory addresses are memory addresses involved in dependent accesses in the instruction stream of the test case 120, it is not necessarily the case that such a marked memory address will be accessed by continuing to execute the test case 120 after the attempt to access secure data. As described above, in some embodiments of the invention, the operation with the secure data access caused a branch, either implicitly or explicitly. Thus, although operations involving marked memory addresses appear in the instruction stream after the secure data access, such operations are not necessarily executed due to having branched.

Hypothetically, it could be possible for the monitor 165 to be unaware of access to a marked memory address due to cache preloading or lack of cache preloading. To address this, the logic simulation model 155 may be prevented from preloading the cache for a load operation, or may be forced to preload the cache for a store operation. In this disclosure, the term "cache" can refer to a cache on a processor or to various other storage components closer to a computer processor than is main memory. For example, and not by way of limitation, the cache may store instructions for processing, translation logic, or branch prediction logic.

When data from a marked memory address is preloaded into the cache for a load operation, such that the logic simulation model 155 would not need to send a request to the simulated memory 160 for that data, then the monitor 165 cannot detect access to the marked address in simulated memory 160, as no such access would be required due to the preloading, according to some embodiments of the invention. Analogously, when data from a marked memory address is not preloaded into the cache for a store operation, then the store operations can take place in the cache without accessing the simulated memory 160, and again, the monitor 165 may fail to detect the access to the marked memory address, according to some embodiments of the invention. To avoid this circumstance, the logic simulation model 155 may be prevented from preloading the cache from one or more marked memory addresses (e.g., for dependent load operations) or may be forced to preload the cache from one or more other marked memory addresses (e.g., for dependent store operations). Preventing or forcing cache preloading can be performed, for example, as indicated in the test case 120 by the test generator 110. In other words, at the direction of the test case 120, the logic simulation model 155 may prevent or perform cache preloading of marked memory addresses as indicated in the test case 120.

Upon detecting an attempted access to marked memory (e.g., in the form of a request for access to the marked memory), the monitor 165 may treat the attempted access as a security violation. For instance, the monitor 165 may alert of each such attempted access. The alert may take various forms, such as a log or a report. For example, and not by way of limitation, the monitor 165 may cause the simulation environment 150 to post an error. Such alerts could be used, for example, to improve security features in the processor design prior to eventual processor fabrication.

In one example, a test case 120 includes an ordered series of operations. At some point in the test case 120, a first operation tries to load secure data into a first register, which causes the logic simulation model 155 to branch to an exception handler. Thus, this instruction includes an implicit branch. The remaining instructions in the test case 120 are considered part of the same instruction stream, and thus, data needed for these instructions could theoretically be speculatively loaded into the cache, which could open the door to a malicious attack.

In this example, a second operation in the test case 120 loads, into a register, from a memory address that is a function of (i.e., based on) data in the first register. Further, in this example, had the secure data access been successful, then the secure data would be stored in the first register when this second operation is encountered. Thus, the second operation is dependent on the first operation. The test generator 110 recognizes the dependency and, therefore, has marked the memory address accessed in the second operation.

It will be understood that dependent accesses need not only be load operations. Rather, in some embodiments of the invention, an operation that stores data based on the secure data access would also be deemed a dependent access. For each later operation after the above first operation in the test case 120, if the later operation is based on the first operation's load into the first register, then that later operation may be deemed dependent on the secure data access, and a memory address accessed in that later operation may, therefore, be marked.

Figure 2:
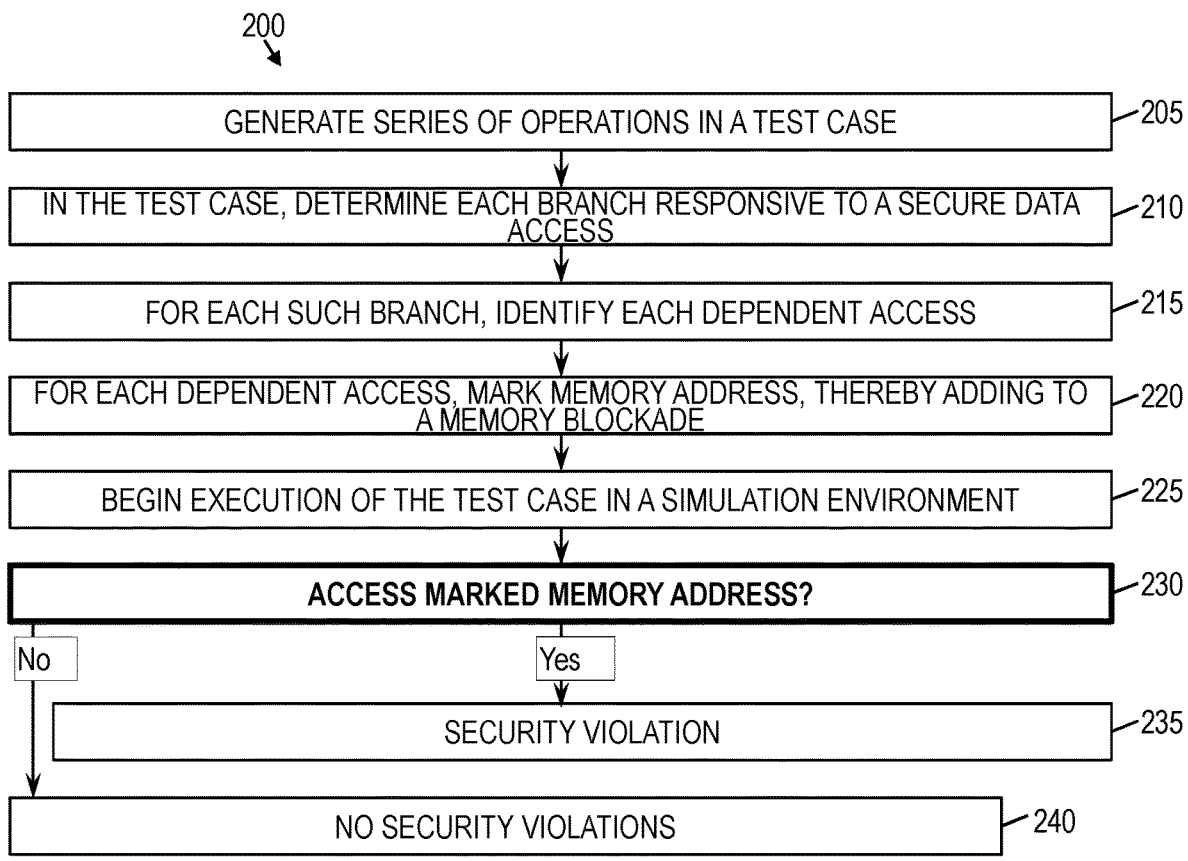
FIG. 2 is a flow diagram of a method of testing a processor to determine whether appropriate protection exists against exploitation of speculative execution, according to some embodiments of the invention.

FIG. 2 is a flow diagram of a method 200 of testing a processor to determine whether appropriate protection exists against exploitation of speculative execution, according to some embodiments of the invention. As shown in FIG. 2, at block 205, for a test case 120, a test generator 110 generates a series of operations. As described above, the series of operations in a test case 120 may include one or more dependent accesses, where the dependency therein is on a secure data access. At block 210, the test generator 110 determines each branch that is responsive to a secure data access in the series of operations. At block 215, for each such branch, the test generator 110 may identify each dependent access. At block 220, the test generator 110 may add, to a memory blockade 133, each memory address of each such dependent access. In other words, each such memory address may be marked for monitoring.

At block 225, execution of the test case 120 begins in a simulation environment 150. At decision block 230, it is determined whether a security violation occurs due to a request to access a marked memory address during the test case 120. At block 245, if such a security violation occurs, then the simulation environment 150 indicates an error. However, if no such security violation occurs, then at block 250, the test case 120 may be deemed completed without a security violation.

Figure 3:
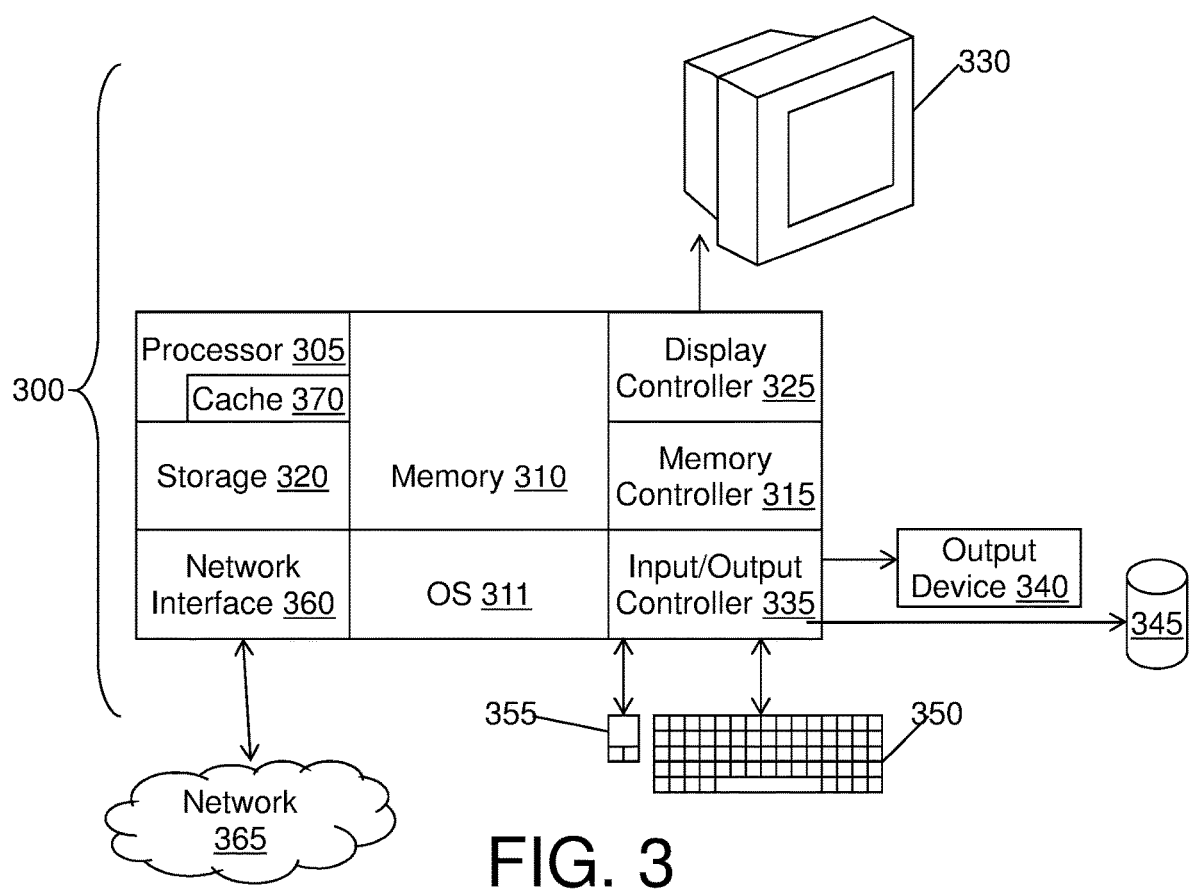
FIG. 3 is a block diagram of a computer system for implementing some or all aspects of the testing system, according to some embodiments of this invention.

FIG. 3 is a block diagram of a computer system 300 for implementing some or all aspects of the testing system 100, according to some embodiments of this invention. The testing systems 100 and methods described herein may be implemented in hardware, software (e.g., firmware), or a combination thereof. In some embodiments, the methods described may be implemented, at least in part, in hardware and may be part of the microprocessor of a special or general-purpose computer system 300, such as a personal computer, workstation, minicomputer, or mainframe computer. For example, and not by way of limitation, the test generator 110 may be one or more computer systems 300 or portions thereof, and the simulation environment may be one or more computer system 300 or portions thereof. Additionally, each test case 120 may be computer software to be executed on a computer system 300.

In some embodiments, as shown in FIG. 3, the computer system 300 includes a processor 305, memory 310 coupled to a memory controller 315, and one or more input devices 345 and/or output devices 340, such as peripherals, that are communicatively coupled via a local I/O controller 335. These devices 340 and 345 may include, for example, a printer, a scanner, a microphone, and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 305 may be a custom made or commercially available processor, a central processing unit (CPU), an auxiliary processor among several processors associated with the computer system 300, a semiconductor-based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, etc.).

The memory 310 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid-state drive. The stored instructions in memory 310 or in storage 320 may include those enabling the processor to execute one or more aspects of the testing systems 100 and methods of this disclosure.

The computer system 300 may further include a display controller 325 coupled to a display 330. In some embodiments, the computer system 300 may further include a network interface 360 for coupling to a network 365. The network 365 may be an IP-based network for communication between the computer system 300 and an external server, client and the like via a broadband connection. The network 365 transmits and receives data between the computer system 300 and external systems. In some embodiments, the network 365 may be a managed IP network administered by a service provider. The network 365 may be implemented in a wireless fashion, e.g., using wireless protocols and technologies, such as WiFi, WiMax, etc. The network 365 may also be a packet-switched network such as a local area network, wide area network, metropolitan area network, the Internet, or other similar type of network environment. The network 365 may be a fixed wireless network, a wireless local area network (LAN), a wireless wide area network (WAN) a personal area network (PAN), a virtual private network (VPN), intranet or other suitable network system and may include equipment for receiving and transmitting signals.

Testing systems 100 and methods according to this disclosure may be embodied, in whole or in part, in computer program products or in computer systems 300, such as that illustrated in FIG. 3.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, FPGAs, or programmable logic arrays (PLAs) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special-purpose hardware-based systems that perform the specified functions or acts or carry out combinations of special-purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
generating a plurality of test cases to test exploitation of speculative execution in a design of a computer processor, the plurality of test cases comprising a first test case;
wherein generating the first test case comprises:
identifying a branch responsive to an attempted access to secure data; and
responsive to the branch, marking each memory address of each memory access dependent on the attempted access to the secure data; and
executing the first test case, wherein the executing the first test case comprises:
detecting an attempt to access a memory address that has been marked; and
alerting of a security violation responsive to the attempt to access the memory address that has been marked.

2. The computer-implemented method of claim 1, wherein the executing the first test case is performed in a simulation environment comprising a logic simulation model and a simulated memory, wherein the logic simulation model is a logical representation of the computer processor.

3. The computer-implemented method of claim 2, further comprising monitoring communications from the logic simulation model to the simulated memory, wherein the detecting the attempt to access the memory address that has been marked is performed based on the monitoring.

4. The computer-implemented method of claim 3, wherein the marking each memory address of each memory access dependent on the attempted access to the secure data comprises instructing transmission of one or more messages to the logic simulation model to indicate each memory address to be marked.

5. The computer-implemented method of claim 1, further comprising at least one of:
preventing cache preloading for a load operation from a first memory address that has been marked; and
forcing cache preloading for a store operation to a second memory address that has been marked.

6. The computer-implemented method of claim 1, wherein the plurality of test cases each comprise a respective series of operations, wherein each respective series of operations comprises a respective attempt to access secure data and a dependent access based on the respective attempt to access secure data.

7. The computer-implemented method of claim 1, wherein the identifying the branch responsive to the attempted access to the secure data comprises identifying an exception.

8. A system comprising:
a test generator configured to:
generate a plurality of test cases to test exploitation of speculative execution in a design of a computer processor, the plurality of test cases comprising a first test case;
detect, in the first test case, a branch responsive to an attempted access to secure data; and
responsive to the branch in the first test case, mark each memory address of each memory access dependent on the attempted access to the secure data; and
a simulation environment comprising:
a logic simulation model, wherein the logic simulation model is a logical representation of the computer processor; and
a simulated memory;
wherein the simulation environment is configured to execute the first test case over the logic simulation model and the simulated memory, and wherein, to execute the first test case, the simulation environment is configured to:
detect an attempt to access a memory address that has been marked; and
alert of a security violation responsive to the attempt to access the memory address that has been marked.

9. The system of claim 8, wherein the simulation environment further comprises a monitor configured to monitor communications from the logic simulation model to the simulated memory, wherein the monitor detects the attempt to access the memory address that has been marked is performed based on the monitoring.

10. The system of claim 9, wherein, to mark each memory address of each memory access dependent on the attempted access to the secure data, the monitor is configured to transmit one or more messages to the logic simulation model to indicate each memory address to be marked.

11. The system of claim 8, wherein the test generator performs at least one of:
preventing cache preloading for a load operation from a first memory address that has been marked; and
forcing cache preloading for a store operation to a second memory address that has been marked.

12. The system of claim 8, wherein the plurality of test cases each comprise a respective series of operations, wherein each respective series of operations comprises a respective attempt to access secure data and a dependent access based on the respective attempt to access secure data.

13. The system of claim 8, wherein, to detect the branch responsive to the attempted access to the secure data, the test generator detects an exception.

14. A computer-program product for testing a processor design, the computer-program product comprising a computer-readable storage medium having program instructions embodied therewith, the program instructions executable by a processor to cause the processor to perform a method comprising:
generating a plurality of test cases to test exploitation of speculative execution in a design of a computer processor, the plurality of test cases comprising a first test case;

identifying, in the first test case, a branch responsive to an attempted access to secure data;

responsive to the branch in the first test case, marking each memory address of each memory access dependent on the attempted access to the secure data; and executing the first test case over a logic simulation model and a simulated memory, wherein the logic simulation model is a logical representation of the computer processor, and wherein the executing the first test case comprises:

detecting an attempt to access a memory address that has been marked; and alerting of a security violation responsive to the attempt to access the memory address that has been marked.

15. The computer-program product of claim 14, the method further comprising monitoring communications from the logic simulation model to the simulated memory, wherein the detecting the attempt to access the memory address that has been marked is performed based on the monitoring.

16. The computer-program product of claim 15, wherein the marking each memory address of each memory access dependent on the attempted access to the secure data comprises instructing transmission of one or more messages to the logic simulation model to indicate each memory address to be marked.

17. The computer-program product of claim 14, the method further comprising at least one of:

preventing cache preloading for a load operation from a first memory address that has been marked; and forcing cache preloading for a store operation to a second memory address that has been marked.

18. The computer-program product of claim 14, wherein the plurality of test cases each comprise a respective series of operations, wherein each respective series of operations comprises a respective attempt to access secure data and a dependent access based on the respective attempt to access secure data.

19. The computer-program product of claim 14, wherein the identifying the branch responsive to the attempted access to the secure data comprises identifying an exception.

20. The computer-program product of claim 14, wherein, in the first test case, each memory address related to an access dependent on the attempt to access the secure data is excluded from memory accesses outside of accesses dependent on the attempt to access the secure data.

* * * * *